United States Patent [19]

Frigo

[11] 4,050,870

[45] Sept. 27, 1977

[54] MOLDING PRESS HAVING A DEVICE FOR GRIPPING AND DELIVERING ELEMENTS TO BE MOLDED

[75] Inventor: Vito Frigo, Cervignano del Friuli (Udine), Italy

[73] Assignee: Ausatuft S.p.A., Italy

[21] Appl. No.: 609,977

[22] Filed: Sept. 3, 1975

[30] Foreign Application Priority Data

Sept. 17, 1974  Italy .................................. 27359/74

[51] Int. Cl.² ............................................... B29C 3/04
[52] U.S. Cl. ................................ 425/317; 214/1 BB; 425/436 R; 425/DIG. 200
[58] Field of Search ......... 214/1 BB; 425/317, 436 R, 425/DIG. 200, DIG. 201, 455 R, 254

[56] References Cited

U.S. PATENT DOCUMENTS

| | | | |
|---|---|---|---|
| 2,910,727 | 11/1959 | Salbeck et al. .................. | 425/455 X |
| 3,025,566 | 3/1962 | Kostur ................................... | 425/388 |
| 3,260,376 | 7/1966 | Stoll ..................................... | 214/1 BB |
| 3,350,756 | 11/1967 | Brand ................................... | 425/455 X |
| 3,397,424 | 8/1968 | Rovde et al. ...................... | 425/455 X |
| 3,596,322 | 8/1971 | Swezey ........................ | 425/DIG. 200 |
| 3,770,140 | 11/1973 | Duckette ........................... | 214/1 BB |
| 3,862,815 | 1/1975 | Roczynski et al. .............. | 425/455 X |
| 3,921,820 | 11/1975 | Crockett ............................ | 214/1 BB |

*Primary Examiner*—Robert L. Spicer, Jr.
*Attorney, Agent, or Firm*—Steinberg & Blake

[57] ABSTRACT

A molding press is disclosed, comprising a device for gripping and delivering the elements to be molded, wherein movable means are provided in association with said press, such means performing the function of withdrawing the material to be molded as well as the molded product and positioning it respectively at withdrawal position, said means comprising arms carrying pliers or gripping means slidable on a guide to grip and position the material.

6 Claims, 8 Drawing Figures

MOLDING PRESS HAVING A DEVICE FOR GRIPPING AND DELIVERING ELEMENTS TO BE MOLDED

The system is already known for providing substantially tridimensional manufactured articles from full or solid elements, generally felts or fabrics, the system consisting of impregnating such elements with thermoplastic or thermo-setting resins, or resins of any type, and heat molding such elements on suitable molds carried on a press. According to some known techniques, the impregnated elements are pre-heated and then molded in presses, where the molds are cooled down, in order that the resins may be cured during molding operation, while the material is retained within the mold, whereby at the press outlet said material will have the desired time-steady spatial configuration.

It has also been already proposed to dress the material to be molded, particularly textile material, on frames comprising a rectangular framework, on one face carrying pins for retaining the textile material, which is held at stretched condition on the framework, thus enabling the textile material handling without such drawbacks as due to its poor dimensional stability prior to molding operations.

It will now be apparent that when heating the elements to be molded before such elements are carried to the molding press, the disadvantage would occur of positioning said elements at a suitable position under the press, and this because said elements have to be withdrawn from the furnace and while still at a high temperature must be positioned under the press. This, even if aided in that the piece handling is considerably improved by using the frames above referred to, is however still affected by such disadvantages as those due to temperature being experienced both by the material and frame, and the necessity of being withdrawn by suitable means from the baking furnace to be carried under the press, and this would cause a number of risks to the operators assigned to such a task.

Following the molding operation, the materials have to be removed from the press and supplied to the successive processings. In addition to the above cited disadvantages, a procedure in accordance with the systems as hitherto used would involve the necessity of particular labour, long times required for piece transferring and positioning, frequent shifts of the operators because of the heavy duty, and many other drawbacks well known to those skilled in the art.

Conversely, this invention aims to overcome such disadvantages by proposing a press provided with automatic devices for withdrawing, in the case directly from the furnace, the elements to be molded, the positioning thereof below the press planes, and finally the delivery thereof at the outlet.

To accomplish such objects, a press is provided which is characterized in that a guide is fixed to the press upright and extends from one to the other side with respect to said upright, said guide carrying two arms slidable thereon, the arms extending to the press planes and carrying pliers or gripping means, of which one is for gripping the material to be inserted under the press, and the second for gripping the molded material, said arms then moving so that the first arm will take a suitable position for arranging the material to be molded under the press, whereby the second arm is positioned externally of the press plane for unloading the molded material, means being also provided for opening said pliers or gripping means, moving said pliers to such a position as not to interfere with other elements during the back stroke, and means for causing all the parts of the press to resume the initial positions, ready for a new cycle.

These and other features will become more apparent from the following detailed description, given by mere way of unrestrictive example, and referred to the event where a press according to the invention will withdraw the material to be molded from a tunnel type of furnace, wherein the material is carried by frames, and the molded material, still carried by the frames, is unloaded on an outgoing conveyor belt. Of course, such an exemplary application should not be intended as restrictive in any way, since the inventive concept to be more clearly explained hereinafter can be applied to any type for withdrawing material to be molded and delivering said material at the press outlet.

Such an exemplary embodiment is shown in the accompanying drawings, in which.

Figure 1:
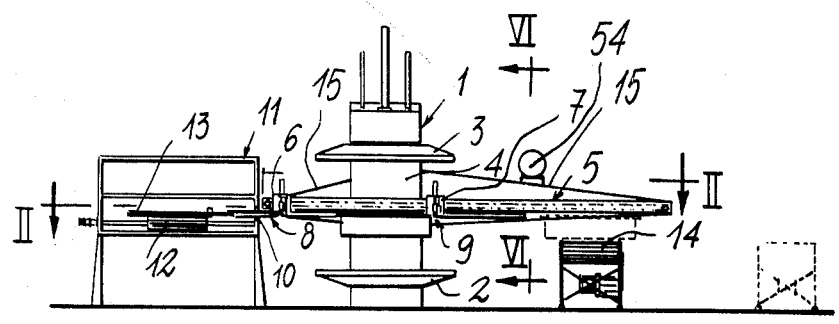
FIG. 1 is a diagrammatic front view of a press according to the invention, having on one side a tunnel type of furnace and on the other side an outgoing conveyor belt.
Figure 2:
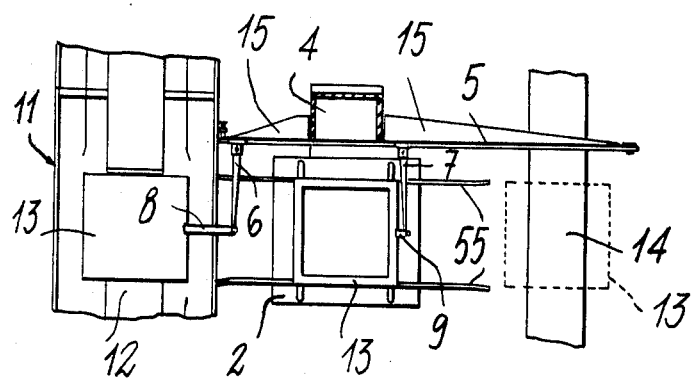
FIG. 2 is a diagrammatic plan view corresponding to line II—II of FIG. 1.

Referring now particularly to FIGS. 1 and 2, a press according to the invention comprises a main body 1 carrying a base plate 2 and a top plate 3, the latter being capable of lowering to exert some pressure again the articles placed on the base plate 2. The press upright 4 has connected thereto a guide, generally designated at 5, on which arms 6 and 7 carrying pliers or gripping means 8 and 9 can slide.

Figure 8:
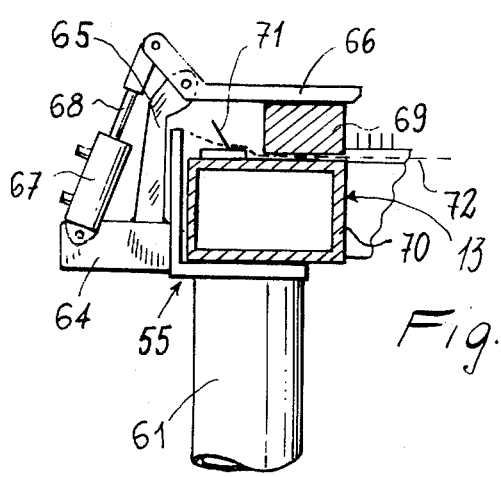
FIG. 8 is a diagrammatic sectional view showing a detail at the bearing and positioning elements of the frames.

Pliers 8 can penetrate into the side opening 10 of a furnace, generally designated at 11, in which there are frames 13 bearing on a plane 12, which may also be a conveyor belt as shown in the drawing, such frames 13 carrying the material 72 to be molded and retained by pins 71 (FIG. 8).

On the opposite side of furnace 11 with respect to press 1, a conveyor belt 14 is arranged.

As it will be more particularly seen hereinafter, starting from the position shown in FIGS. 1 and 2, pliers or gripping means 8 have already gripped the end adjacent thereto of a frame 13 within the furnace, and pliers 9 have simultaneously gripped the frame located on the press table or plane. Under these conditions, a control drives the synchronous translation of arms 6 and 7 in such a direction that pliers 8 move out of the furnace, carrying along said frame 13. The movement of arms 6 and 7 continues until frame 13 from the furnace is positioned over the press base plate 2, and at the same time the frame, which was formerly in the press, is positioned, as shown by dashed lines in FIGS. 1 and 2, on conveyor belt 14.

Now, said pliers 8 and 9 will open, thus leaving the respective frames, the molded frame being carried away by conveyor belt 14, and then are upward moved to reach a higher level than the frames, and are moved back in a direction opposite to the first travelled direction. During such a movement, the pliers are lowered again to reach the desired level, and on arriving at the end of their stroke or path, the pliers will close again, with pliers 8 gripping a new hot frame just positioned, and pliers 9 gripping that frame which has been previously positioned by pliers 8. The material placed on the press is now molded, whereupon, and following a sufficient period of time, planes 2 and 3 are moved away, an extractor to be described hereinafter is operated for removing the molded product from its associated mold, and the machine is ready for a new cycle.

Figure 3:
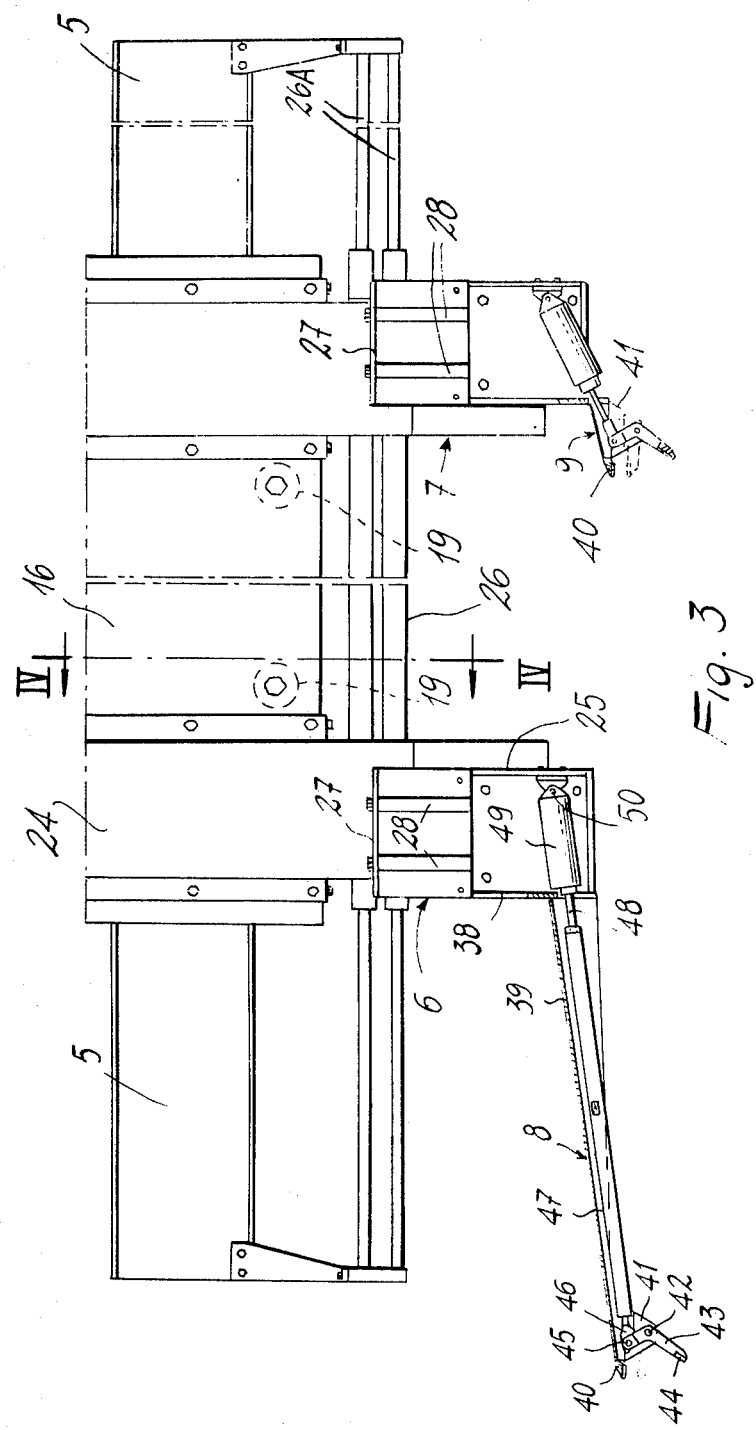
FIG. 3 is an enlarged view showing the guides and pliers or gripping means, which view has been taken in the same direction of FIG. 1, some parts being shown in section.
Figure 4:
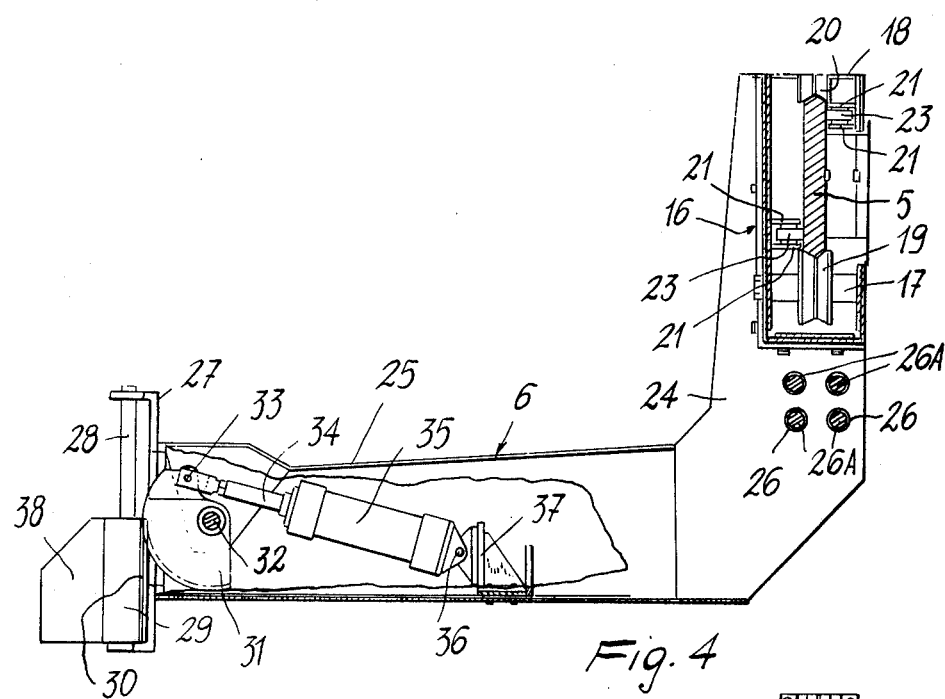
FIG. 4 is a sectional view taken along line IV—IV of FIG. 3, and referring to the movable arms only.
Figure 5:
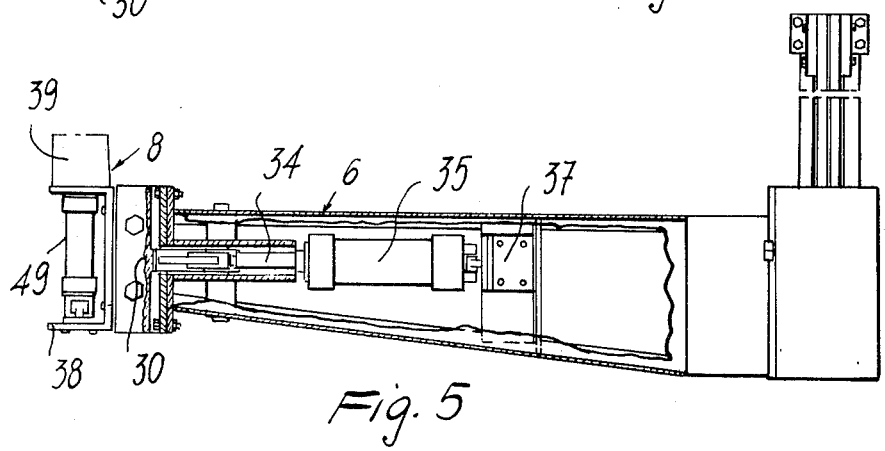
FIG. 5 is a top view with some parts cut away and in section, showing the object of FIG. 4.

Particularly referring now to FIGS. 3, 4 and 5, the arms and respective pliers are illustrated therein. To this end, the main upright 4 of the press has secured and suitably restrained thereto a sturdy guide 5 which, as shown in FIG. 2, extends on one side towards the furnace, and on the other side beyond conveyor belt 14. This guide is firmly held by suitable bracings stiffeners 15 (FIG. 2) which are secured to the press upright 4. A box-like casing, generally designated at 16, has wheels 19 and 20 idly mounted therein on axes or shafts 17 and 18, the profile of such wheels exactly matching that of guide 5 on which the wheels can roll. Conveniently, such wheels 19 and 20 are grooved and the ends of guide 5 are V-shaped. Said box-like casing has also shoulders 21 secured thereto, these shoulders carrying guide rollers 23 for bearing the moment transferred thereto by the weight and strains acting on arms 6 and 7. Said arms 6 and 7 are fixed to box-like casing 16. Such arms are substantially identical, whereby the following description relating to arm 6 is also valid for arm 7. The difference is in the different distance of pliers 8 and 9 from the respective arm. Arm 6 consists of a first downward projecting portion 24, and a second portion 25 extending to the press planes to arrive at about the centerline thereof. Guide tubes 26 can be mounted on arm portion 24 for sliding on tubular guides 26A fast with the press upright in order to better withstand the strains being transmitted by arm 6.

At least at its portion 25, said arm 6 is configured as a box-like member and at its free end has a C-shaped element 27, having cylindrical rods 28 secured thereto. A slide 29 is slidable on said cylindrical rods 28 and at its end facing arm 6 carries a rack toothed zone 30 meshing with a toothed sector 31 pivoted at 32 to arm portion 25. The end of a stem 34 of a hydraulic or pneumatic cylinder 35 is pivoted at 33 to one end of said toothed sector while, in turn, this cylinder 35 is pivoted at 36 to a support 37 fast with the wall of arm portion 25, and preferably located internally of the latter. At the circumstance shown in FIG. 4, slide 29 is at its lower position, and piston 34 is at its position of outer end of stroke, completely extended externally of cylinder 35. It will be readily appreciated that, by controlling cylinder 35 for retracting piston 34, motion will be transmitted to slide 29, so that the latter is raised.

Slide 29 has a C-shaped element 38 fixed thereto, to one end of this element 38 there being firmly fixed a body member 39 which, along with the other parts to be discussed hereinafter, forms the pliers generally designated at 8. The free end of body member 39 terminates with a fixed jaw 40, and an angled lever 43 carrying a jaw 44 at its free end is pivoted at 42 to one of gussets 41 arranged laterally of jaw 40, the other end of said lever 43 being pivoted at 45 to the end 46 of a rod 47 which is connected to the stem or piston 48 of a hydraulic or pneumatic cylinder 49, the other end of which being pivoted at 50 to said C-shaped element or support 38. Advantageously, rod 47 can be screw threaded at its end, and similarly the ends of the stem or piston and end 46 can be screw threaded, so that by regulating said rod 47, the opening and clamping conditions of pliers 8, or jaws 40 and 44, can be adjusted. It will now be readily understood that, starting from the position shown in FIG. 3, where cylinder 49 is acted upon to inwardly move its associated stem or piston, jaws 40 and 44 will allow for gripping a frame placed therebetween.

As clearly shown in FIG. 3, the other pliers 9 are similarly made as pliers 8, with the obvious exception that the pliers 9 will outwardly extend to a less amount, since a large length thereof is not required to penetrate into the furnace for frame withdrawal.

Figure 6:
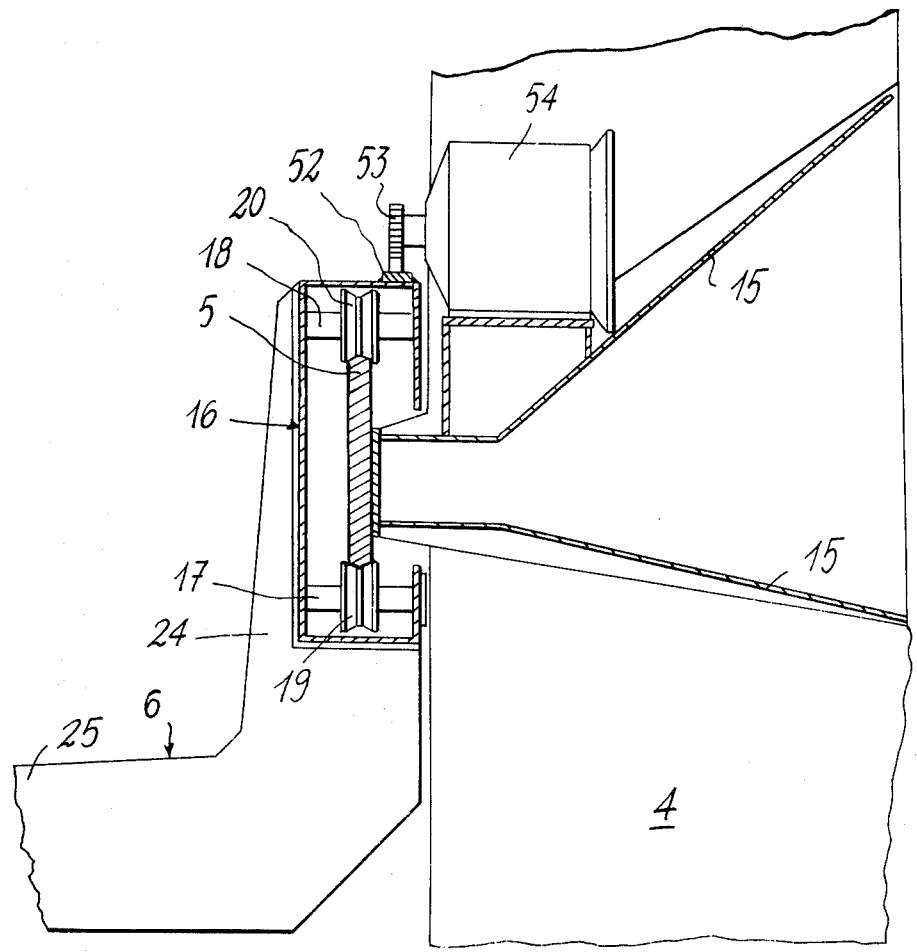
FIG. 6 is a sectional view taken along line VI—VI of FIG. 1, showing a portion of the press at the movable arms.

A rack 52 is carried for a sufficient length on box-like casing 16 and meshes with a pinion 53 of a motor 54 secured to the press stiffeners 15 (FIG. 6).

It will now be readily understood that, due to motor 54, arms 6 and 7, and accordingly pliers 8 and 9, can slide along guide 5 for a desired stroke length, and additionally that, through the several hydraulic pistons, pliers 8 and 9 can open and close to grip and release the materials, and also upward or downward move owing to sliding of slide 29 on guides 28 so that, once a material has been placed on the press plate, such pliers can effect their return stroke without encountering again the material.

It is evident that such end of strokes and controls for the several hydraulic or pneumatic pistons will be so arranged as to be driven by the moving members, and in the present description such controls and stop and run reversal members are neither shown nor described, as being standard circuits in the range of any skilled person in the art.

Figure 7:
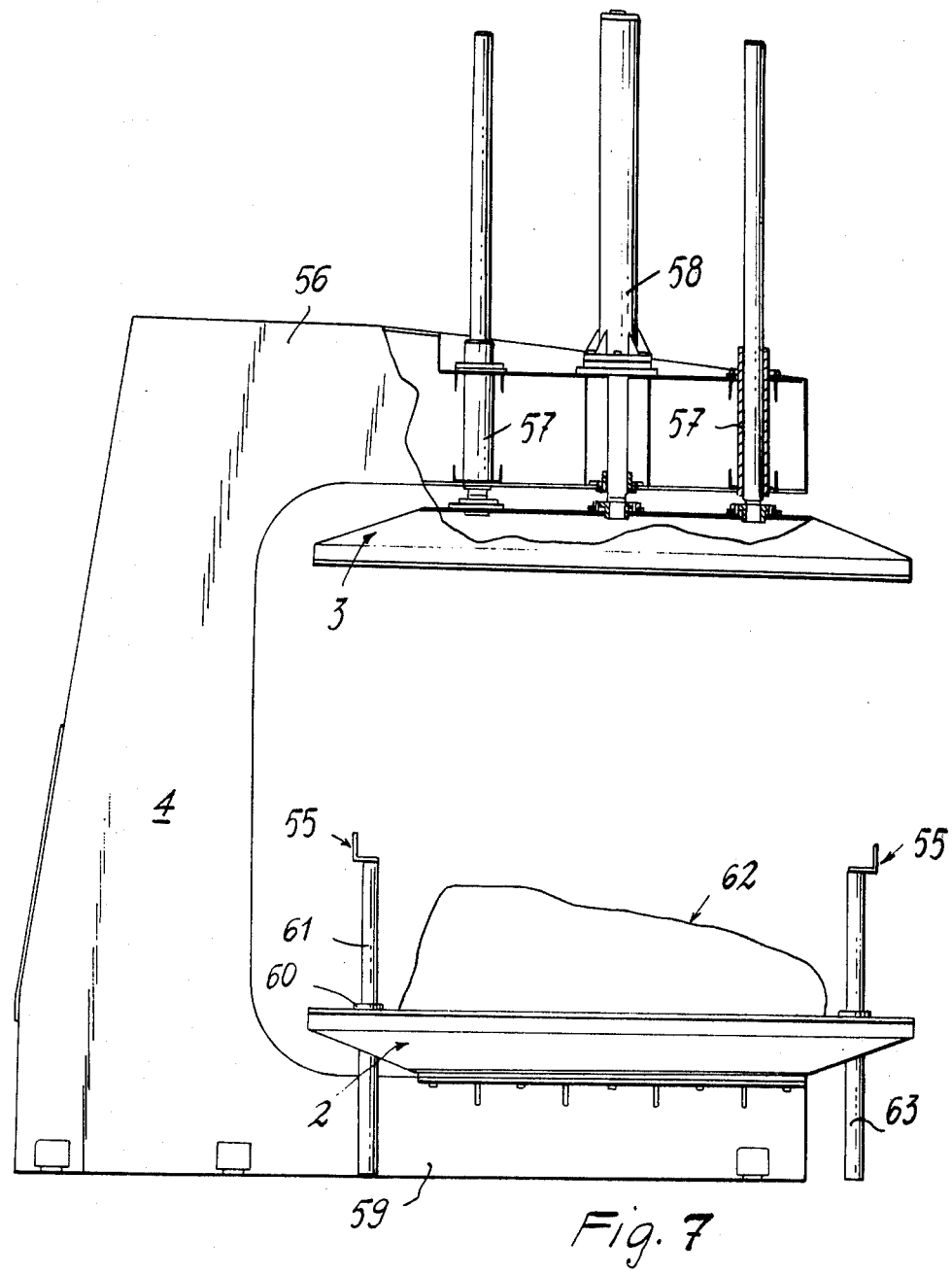
FIG. 7 is a diagrammatic sectional view of the press, the movable arms having been removed.

Let us now consider FIG. 7, showing a schematic side view of the press. As shown in this figure, main upright 4 is bent at the top and in its upper arm 56 accomodates guides 57 of the main hydraulic piston 58 due to depression of upper plate 3, to which the dolly, not shown in the drawing, will be secured in known manner. At the bottom, said main upright 4 merges with a base 59 carrying the lower plate 2, having in seats or housings 60 mounted thereon such elements as extracting-dampening columns 61, the structure and function of which will become more apparent in the following. L-shaped guides 55 are connected at the top of said columns 61 (FIG. 2) and extend from one side nearly to the furnace inlet or mouth, where they are V-shaped, and from the other side to nearly over the outgoing conveyor belt, and are intended to receive the frames being removed from the furnace by the withdrawal pliers. After withdrawing the frame from the furnace, withdrawal pliers 8 will cause such a frame to slide on said guides, performing therefore also a positioning function, and carry it centrally of the press, over the mold resting on plane 2 and schematically shown by reference numeral 62.

According to a per se known arrangement, such molds are internally cooled by circulation of a refrigerating liquid, to cool down the material withdrawn from the furnace during molding operation, so that on molding completion the material is molded according to the desired configuration, as determined by mold 62 and associated dolly.

In FIG. 7, suppose then a frame (not shown) positioned between guides 55 above mold 62 and ready for molding, and as first approximation assume that columns 61, as the upper press plane or table 3 lowers, can also partially follow such a movement in order to avoid an undue stretch of the material to be molded at its attachment to the frames.

It will be understood that, as plane or table 3 is lowered and according to the above statement, the material ready for molding and placed between mold 62 and associated dolly, will be clamped or squeezed therebetween, taking the spatial configuration, and will harden or cure due to mold cooling, thus attaining the desired object. Following pre-determined molding time and according to known techniques, the upper press plate or table will raise, as well as columns 61 along with guides 55 and frame positioned therebetween, thus enabling pliers 9 to withdraw the frame carrying the molded product and transfer, as previously shown, such a frame on conveyor belt 14.

The structure and operation of columns 61 is as follows: each of columns 61 forms the stem or piston of a hydraulic cylinder 63, which receives pressurized oil from a suitable gearbox, not shown, through a pressure accumulator, of the type having a tank with a resilient diaphragm dividing an oil chamber of an air chamber within the tank.

Thus, as the control pressure is varied, the columns can raise or lower while, when positioned, they can move to some extent, owing to the pressure accumulator against external forces, such as press closing.

FIG. 8 shows the blocking system for the frames on guides 55; it will be seen that laterally of guides 55, and to the machine outside, lugs or projections 64 are provided and carry bearings 65, to which levers 66 are pivoted, while a piston assembly 67, 68 acts between bearing 64 and lever 66.

A pressers 69 is arranged at the other end of lever 66 parallel to guides 55, and preferably extending throughout or almost throughout the length thereof.

The parts are of such a size that, should 70 be one of the sides of a frame 13, carrying pins 71 and having dressed thereon a textile material 72 to be molded, under the action of said cylinder-piston assembly 67,68, the pressers 69 will retain guides 55, frames 13 and at the same time textile material 72 between said pressers and sides 70, so that as molding operation is carried out, said textile material 72 can be stripped of pins 71.

Of course, control or drive to cylinders 67 can be imparted by means well known to those skilled in the art, and additionally pressers and associated guides can be provided on only some or all of the sides at frames 13.

Moreover, although only one preferred embodiment of a press according to the invention has been shown and described, the invention is not to be intended as limited thereto, but is to be considered as extended to all of the possible changes and variations.

I claim:

1. In a molding press, molding means situated at a molding station for molding an article to a given configuration, a delivery station to which molded articles are to be delivered, a supply station from which articles are supplied to be molded at said molding station, a pair of gripping means one of which is provided for gripping an article at said supply station and transferring the latter to said molding station and the other of which is provided for gripping an article molded at said molding station and transferring the latter to said delivery station, and moving means operatively connected to both of said gripping means for moving said one gripping means from said supply station to said molding station and for simultaneously moving the other gripping means from said molding station to said delivery station, said one gripping means gripping the article at said supply station and carrying the latter to said molding station and releasing the article at the latter station while said other gripping means simultaneously grips a molded article at said molding station and carries the latter to said delivery station for releasing the latter at said delivery station, a guide means extending across said molding station to one side thereof toward said supply station and to an opposite side thereof toward said delivery station, said moving means including a carriage movable along said guide means, a pair of arms carried by said carriage, and said pair of gripping means being respectively carried by said arms, each of said arms carrying at an end thereof a slide means, and said pair of gripping means being respectively slidable on the pair of slide means respectively situated at the ends of said arms.

2. The combination of claim 1 and wherein each gripping means has a rack fixed thereto, each of said arms being hollow and carrying a turnable gear sector meshing with said rack while also carrying a fluid-pressure means cooperating with said gear sector for turning the latter and acting on said rack to displace each gripping means along each slide means.

3. In a molding press, molding means situated at a molding station for molding an article to a given configuration, a delivery station to which molded articles are to be delivered, a supply station from which articles are supplied to be molded at said molding station, a pair of gripping means one of which is provided for gripping an article at said supply station and transferring the latter to said molding station and the other of which is provided for gripping an article molded at said molding station and transferring the latter to said delivery station, and moving means operatively connected to both of said gripping means for moving said one gripping means from said supply station to said molding station and for simultaneously moving the other gripping means from said molding station to said delivery station, said one gripping means gripping an article at said supply station and carrying the latter to said molding station and releasing the article at the latter station while said other gripping means simultaneously grips a molded article at said molding station and carries the latter to said delivery station for releasing the latter at said delivery station, said molding means at said molding station including a table, a plurality of movable columns situated at said table, and an article guide means carried by said columns for supporting and guiding an article which is molded and which is acted upon by said pair of gripping means.

4. In a molding press, molding means situated at a molding station for molding an article to a given configuration, a delivery station to which molded articles are to be delivered, a supply station from which articles are supplied to be molded at said molding station, a pair of gripping means one of which is provided for gripping an article at said supply station and transferring the latter to said molding station and the other of which is provided for gripping an article molded at said molding station and transferring the latter to said delivery station, and moving means operatively connected to both of said gripping means for moving said one gripping means from said supply station to said molding station and for simultaneously moving the other gripping means from said molding station to said delivery station, said one gripping means gripping an article at said supply station and carrying the latter to said molding station and releasing the article at the latter station while said other gripping means simultaneously grips a molded article at said molding station and carries the latter to said delivery station for releasing the latter at said delivery station, a guide means extending across said molding station to one side thereof toward said supply station and to an opposite side thereof toward said delivery station, said moving means including a carriage movable along said guide means, a pair of arms carried by said carriage, and said pair of gripping means being respectively carried by said arms, an article guide means extending substantially parallel to said first-mentioned guide means parallel to the latter almost up to said supply station and said delivery station for guiding an article during movement thereof between said stations.

5. The combination of claim 4 and wherein said molding means includes a press table, a plurality of movable columns being situated at the latter table and carrying said article guide means, and damping means cooperating with said columns for damping the movement thereof.

6. The combination of claim 5 and wherein a presser means cooperates with said article guide means for pressing an article to the latter guide means at the region of said columns, and fluid-pressure means cooperating with said presser means for operating the same.

* * * * *